Figure 6:
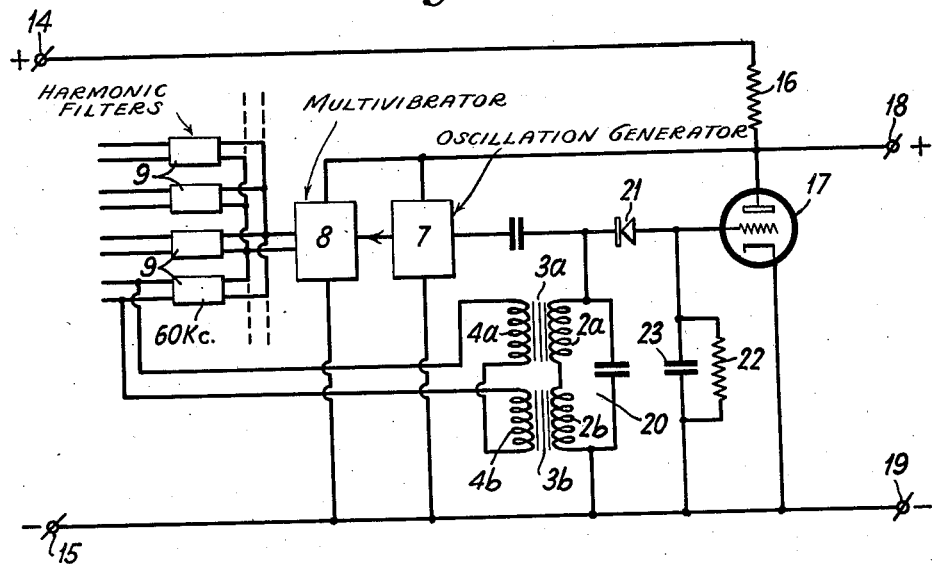

Aug. 4, 1942.	G. HEPP	2,291,715
IRON CORE INDUCTANCE CONTROL
Filed May 11, 1940	3 Sheets-Sheet 1
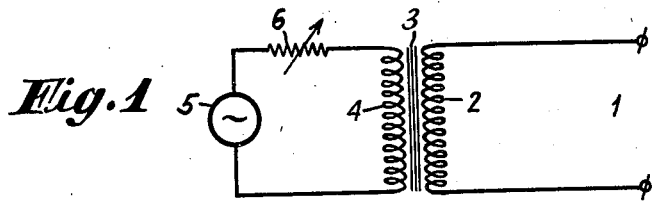
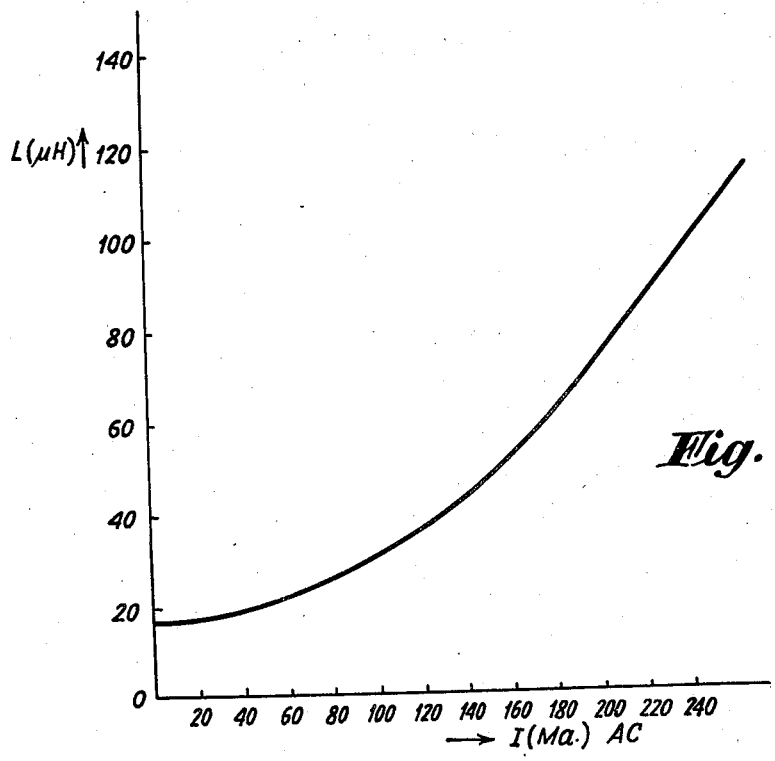
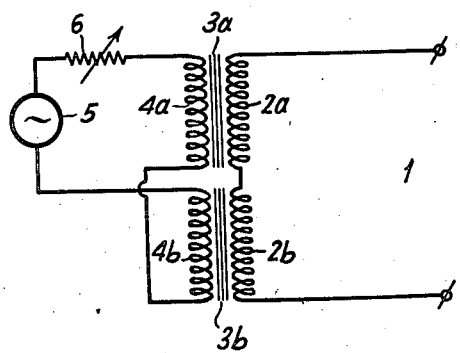
INVENTOR
GERARD HEPP
BY H. S. Srover
ATTORNEY

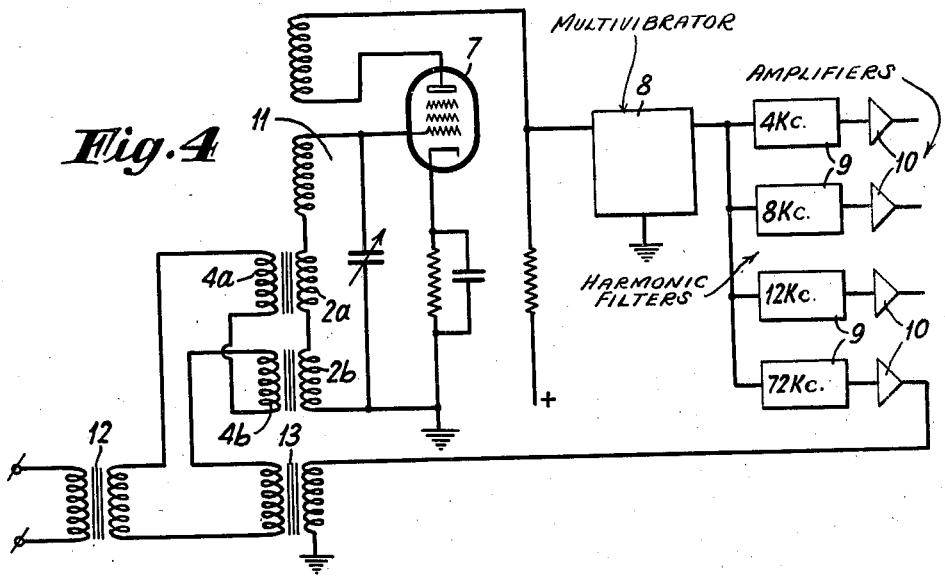
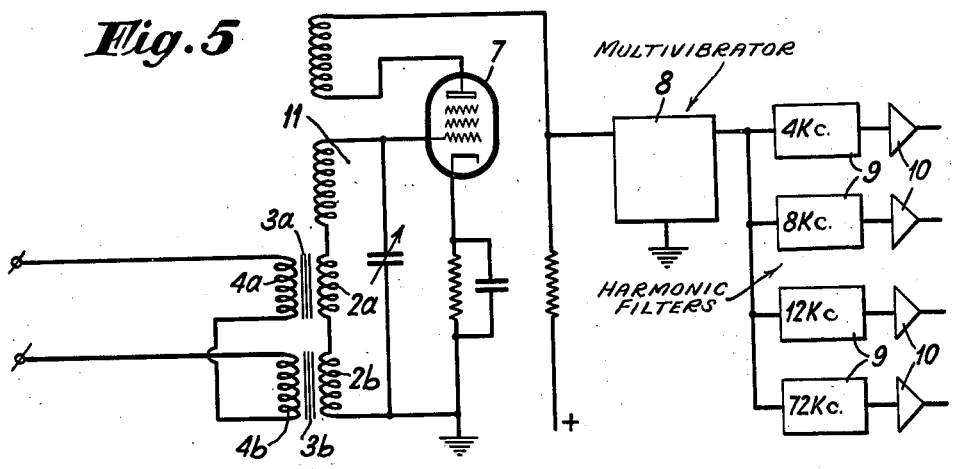

Aug. 4, 1942.                G. HEPP                    2,291,715
                    IRON CORE INDUCTANCE CONTROL
                       Filed May 11, 1940           3 Sheets-Sheet 3

INVENTOR
GERARD HEPP
BY
ATTORNEY

Patented Aug. 4, 1942

2,291,715

UNITED STATES PATENT OFFICE 2,291,715

IRON CORE INDUCTANCE CONTROL

Gerard Hepp, Eindhoven, Netherlands, assignor to Radio Corporation of America, New York, N. Y.

Application May 11, 1940, Serial No. 334,530
In Germany April 17, 1939

3 Claims. (Cl. 250—36)

The invention relates to circuit-arrangements comprising a variable inductance, which are utilised, for example, for synchronisation purposes, for the remote tuning of oscillatory circuits (for example the oscillator circuit) in radio-receivers, for keeping constant voltages, etc.

It has previously been proposed to effect the desired alteration of the self-induction of a coil by providing the latter with an iron core whose magnetisation is controlled by means of a direct current. Owing to the non-linearity of the magnetisation curve the permeability of the iron core and therefore the self-induction of the coil depend upon the value of the direct current with which the iron core is magnetized.

This method of controlling the self-induction has, however, the great drawback that the variation of the self-induction produced with an increasing magnetisation is not equal to the variatio nof the self-induction which is obtained with an equally large decrease in magnetisation, which is due to the hysteresis phenomena occurring in the core.

According to the invention, this drawback is avoided by utilising a variable inductance consisting of a coil provided with an iron core, with which the variation of the self-induction is brought about by a variation of the amplitude of the alternating field produced in the iron by a controlling alternating current.

The invention is based on the recognition that, upon controlling the self-induction of a coil provided with an iron core by means of a control alternating current, during each cycle of this current the whole of the magnetisation curve is passed through, so that the self-induction is determined by the average slope of the magnetisation curve. In the case of variation of the amplitude of the control alternating current another magnetisation curve having another average slope is passed through. Since the average slope of the magnetisation curve is decisive for the average self-induction of the coil it is consequently possible to control this self-induction by controlling the amplitude of the control alternating current.

A further advantage which can be obtained with the circuit-arrangement according to the invention is based on the fact that an increase or decrease of the amplitude of the control alternating current results in a variation of the self-induction which is contrary to the variation of the self-induction which occurs with an increase or decrease of the direct current when the variation of the self-induction is obtained in known manner by direct-current magnetisation of the iron core. This fact may be utilised for compensating for undesired self-induction variations.

Figure 7:
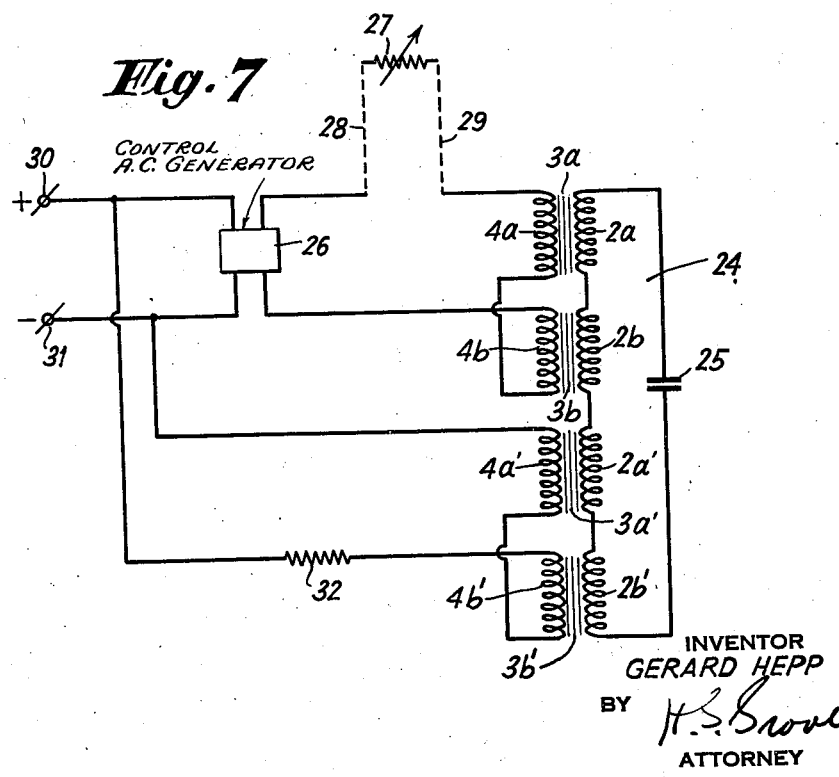

The invention will be explained more fully with reference to the accompanying drawings wherein Fig. 1 shows a general embodiment of the invention; Fig. 2 graphically shows the control characteristic of the coil 2 of Fig. 1; Fig. 3 shows a modification; Fig. 4 shows the invention used for synchronisation; Fig. 5 is a simplified embodiment of Fig. 4; Fig. 6 shows another use of the invention in carrier-wave telephony; Fig. 7 shows the invention used for remote tuning of a receiver.

Fig. 1 represents one embodiment of a circuit-arrangement according to the invention. In this figure I denotes a circuit comprising a variable inductance. This inductance consists of a coil 2 having an iron core 3 on which is provided a winding 4 through which passes a control alternating current furnished by a source of alternating voltage 5 which is connected to the winding 4 through the intermediary of a variable resistance 6. The control current flowing in the winding 4 produces in the iron core 3 an alternating field whose amplitude determines the value of the self-inductance of the coil 2. The amplitude of the alternating field may be adjusted to any desired value by regulating the amplitude of the control alternating current in the winding 4 by means of adjustment of the resistance 6.

Fig. 2 shows the variation of the self-induction L of the coil 2 as a function of the amplitude I of the control alternating current. It appears from this figure that with an increase of the amplitude of the control alternating current the self-induction increases since the average slope of the magnetisation curve of the iron core is, in the case of larger amplitudes of the control alternating current, greater than in the case of smaller amplitudes.

In the circuit-arrangement according to Fig. 1 an alternating voltage whose frequency is equal to that of the control alternating current in the winding 4 is induced in the circuit I which comprises the coil 2. In order to avoid an alternating current which has the same frequency as the control alternating voltage from appearing in the circuit I, use may be made of the circuit-arrangement according to Fig. 3. In this circuit-arrangement the variable inductance in the circuit I consists of two parts 2a and 2b provided with iron cores 3a and 3b respectively. On each iron core there is provided a winding 4a and 4b respectively and these windings are traversed by the control alternating current. The voltage induced by the winding 4a in the coil 2a is opposite to the voltage induced by the winding 4b in the coil 2b since the windings 4a and 4b are traversed in opposite senses by the control alternating current. It is thus avoided that in the circuit I occurs a current having the frequency of the control alternating current. Both windings 4a and 4b produce in the iron cores 3a and 3b an alternating field which may be altered by adjusting the resistance 6. Since in the case of variation of the amplitude of the control alternating current the variation of the average slope of the magnetisation curve takes place in the same sense, the self-induction of the coils 2a and 2b consequently also varies in the same sense.

The same result may be obtained when the windings 4a and 4b are connected in such manner that the magnetic fields in the cores 3a and 3b are in phase. In this case the coils 2a and 2b are connected in the circuit 1 in such manner that the voltages induced in the coils 2a and 2b are in counter-phase with the frequency of the control alternating current.

Fig. 4 illustrates the use of a circuit-arrangement according to the invention for the synchronisation of the oscillations produced by a generator. The generator serves to produce a fundamental frequency from which a plurality of higher harmonics are derived which are to serve as carrier waves in a carrier-wave telephony system. The generator comprises a back-coupled discharge tube 7 which produces a fundamental frequency of, say, 4 kc. This oscillation is supplied to a multivibrator in the output circuit of which are produced a number of higher harmonics, for example 8, 12 . . . 72 kilocycles. These higher harmonics are supplied through filters 9 and, if desired, through amplifiers 10 to the modulators or demodulators of a carrier-wave telephony system where they are modulated by the conversations to be transmitted or are added to the received carrier-wave conversations which are to be demodulated. For the purpose of synchronising the generator 7, which is arranged in a carrier-wave telephony station at one end of a carrier-wave transmission line, with a corresponding generator present in the carrier-wave telephony station at the other end of the carrier-wave transmission line, a synchronising oscillation which is a higher harmonic of the oscillation to be produced by the generator tube 7, for example 72 kilocycles, is supplied from the last-mentioned station to the frequency-determining circuit of the generator tube 7. For this purpose the frequency-determining circuit 11 includes a variable inductance corresponding to the system of Fig. 3, which inductance consists of coils 2a and 2b. The synchronising oscillation is supplied through the intermediary of a transformer 12, to the windings 4a and 4b of the variable inductance. Furthermore, a higher harmonic having the same frequency as the synchronising oscillation, i. e. 72 kilocycles, is taken from the output circuit of the multivibrator 8 and this oscillation is also supplied, via a transformer 13, to the windings 4a and 4b. The described system is so adjusted that when the frequency produced by the generator tube 7, for example, tends to increase there occurs a decreasing phase-displacement between the synchronising oscillation of 72 kilocycles and the higher harmonic derived from the multivibrator 8, which is supplied via the transformer 13 to the windings 4a and 4b. The amplitude of the control alternating current produced which flows in the windings 4a and 4b now increases with the result, as may be seen from the curve according to Fig. 2, that the self-induction of the coils 2a and 2b in the frequency-determining circuit 11 increases, which counteracts the tendency to an increase of the frequency of the oscillation produced by the generator tube 7. The frequency of the oscillation produced by the generator is consequently maintained exactly constant on the value of 4 kilocycles.

When, conversely, the frequency of the generator tends to decrease there must occur an increasing phase displacement between the synchronising oscillation and the higher harmonic taken from the multivibrator 8 and supplied via the transformer 13 to the windings 4a and 4b, so that the amplitude of the control alternating current produced decreases and consequently the self-induction of the coils 2a and 2b is reduced.

In order to ensure that when the generator tends to increase or to decrease its frequency, the self-induction variation of the coils 2a and 2b is such that the increase or decrease is compensated for, it is only necessary that the value of the self-induction of the coils 2a and 2b at which the generator just produces a frequency of 4 kilocycles should occur at a control current amplitude which is smaller than the maximum amplitude and larger than the minimum amplitude of the control current, which maximum or minimum value would occur if between the synchronising oscillation and the higher harmonic of 72 kilocycles taken from the multivibrator 8 there were no phase-displacement or a phase-displacement of 180°.

It is not necessary for the synchronising oscillation to be a higher harmonic of the oscillation to be produced. If desired, it is also possible to supply a synchronising oscillation of 4 kilocycles via the transformer 12 to the windings 4a and 4b, in which event the oscillation supplied via the transformer 13 to the windings 4a and 4b also has a frequency of 4 kilocycles. It is in this case no longer necessary for the latter oscillation to be taken from the output circuit of the multivibrator 8 since the current of the frequency of 4 kilocycles which flows in the frequency-determining circuit 11 may itself be utilised therefor. Such a simplified circuit-arrangement is shown in Fig. 5 wherein the synchronising oscillation of 4 kilocycles is directly supplied to the windings 4a and 4b. Jointly with the oscillation of 4 kilocycles set up in the circuit 11, the said oscillation produces in the cores 3a and 3b an alternating magnetic field whose amplitude is dependent upon the phase-displacement between the synchronising oscillation and the oscillation occurring in the circuit 11. Also in this circuit-arrangement any tendency of the generator to alter its frequency brings about in its turn an alteration of the said phase-displacement, which results in such a variation of the self-induction of the coils 2a and 2b that the said tendency is suppressed.

Although the last-described circuit-arrangement is simpler than that shown in Fig. 4 the latter arrangement is to be preferred since upon synchronisation with a higher harmonic a slight tendency of the generator to alter the frequency of the produced oscillations results in a great alteration of the phase-displacement between the synchronising oscillation and the higher harmonic taken from the generator.

Fig. 6 shows a practical example wherein the circuit-arrangement according to the invention is utilised for keeping constant, in a carrier-wave telephony system, the voltage of a source of D. C. voltage required in this system.

This system comprises a generator 7 which serves to produce an oscillation from which several higher harmonics are derived by means of a multivibrator 8, which harmonics are separated via a filter 9 and act as carrier waves for a plurality of conversations to be transmitted.

The generator 7 and the multivibrator 8 are supplied by a source of D C. voltage which is connected between terminals 14 and 15 and whose voltage fluctuates. In order to derive a constant voltage from this variable voltage the latter is supplied to the series-connection of a resistance 16 and a discharge tube 17 from which is taken a constant voltage which occurs across the terminals 18 and 19. There is provided for this purpose an oscillatory circuit 20 which is tuned to a frequency slightly different from the frequency of the generator 7. The alternating voltage set up across this circuit is rectified by means of a rectifier 21 and the D. C. voltage set up across a resistance 22 shunted by a condenser 23 is supplied to the grid of the tube 17. The inductance of the oscillatory circuit 20 is constituted by a variable inductance such as shown in Fig. 3. To the windings 4a and 4b of this inductance is supplied a control alternating current which is derived from a higher harmonic of the generator 7, for example 60 kilocycles, which occurs in the output circuit of the multivibrator 8.

In the case of variation of the voltage across the terminals 14 and 15 the amplitude of the control alternating current varies with the result that so great a variation in the self-induction of the circuit 20 occurs that the amplitude of the alternating voltage of 4 kilocycles set up across the circuit greatly varies. In consequence, the bias voltage of the grid of the tube 17 and therefore the current flowing via the resistance 16 through the tube 17 vary. The variation thus produced of the drop of voltage across the resistance 16 may, with suitable dimensioning of the system, be such that it substantially compensates for the variation of the voltage across the terminals 14 and 15 and that consequently across the terminals 18 and 19 there occurs a substantially constant voltage.

Fig. 7 represents a practical example wherein a circuit-arrangement according to the invention is utilised for the remote tuning of an oscillatory circuit of a radio-receiver. The oscillatory circuit adapted to be tuned from a distance is denoted in this figure by 24 and comprises a condenser 25 and two variable inductances 2a, 2b and 2a' and 2b'. For the remote tuning of the circuit 24 the cores 3a, 3b of the coils 2a, 2b have provided on them windings 4a and 4b which are supplied with a control alternating current via a resistance 27 by a generator 26 provided in the receiver. The resistance 27 is connected to the receiver by conductors 28 and 29 and the adjustment of the value of this resistance brings about a variation in the amplitude of the control alternating current which results in the desired variation of the tuning of the circuit 24.

The generator 26 which furnishes the control alternating current is supplied by the source of D. C. voltage present in the radio-receiver and connected between the terminals 30 and 31. If this source of D. C. voltage is subject to voltage variations, the amplitude of the oscillations set up by the generator alters with the result that undesired variations of the tuning of the circuit 24 occur.

In order to compensate for these tuning variations the cores 3a' and 3b' of the coils 2a' and 2b' are provided with windings 4a' and 4b' which are supplied by a voltage depending on the source of D. C. voltage between the terminals 30 and 31.

In the embodiment shown the windings 4a' and 4b' are connected via a resistance 32 directly to the terminals 30 and 31. In the case of variations in the voltage across the terminals 30 and 31 there consequently are produced corresponding variations in the self-induction of the coils 2a' and 2b' which also bring about alteration of the tuning of the circuit 24.

Owing to the fact that an increase or decrease of the amplitude of the control alternating current due to a variation of the source of D. C. voltage brings about a variation of the self-induction of the coils 2a and 2b which is opposite to the variation in the self-induction of the coils 2a' and 2b' which is brought about by the said variation of the source of direct current there may be obtained, with a suitably dimensioned system, tuning of the circuit 24 which is substantially independent of variations of the source of D. C. voltage.

What I claim is:

1. In an oscillation generator circuit adapted to generate current of a predetermined frequency, a thermionic tube having a cathode, an anode and an input electrode, a frequency determining circuit for said oscillation generator circuit comprising a variable inductance connected between said input electrode and said cathode, said variable inductance comprising the output windings of two substantially similar iron core transformers connected in series, a source of alternating control current of the frequency to be maintained connected in series with the input windings of said transformers, said input windings being connected reversely in series, and coupling means for impressing at least a part of the generator circuit output across said input windings.

2. In an oscillation generator circuit, an oscillator tube, a frequency determining circuit including an inductance coil having a ferro-magnetic core, a source of control alternating current whose frequency is the same as a frequency desired to be produced, an auxiliary winding wound around said core and connected across said source of alternating current, and means for impressing at least a portion of the output of said oscillator tube across said auxiliary winding.

3. In an oscillation generator circuit which includes an oscillator tube and a tunable resonant circuit for determining the frequency of the produced oscillations, said resonant circuit including an inductance coil provided with a ferro-magnetic core, the method of maintaining the frequency of the generated oscillations the same as the frequency of a control alternating current which method includes the steps of combining current derived from the oscillation generator with the control alternating current and producing from said combination a resultant alternating current, and utilizing said resultant current to set up alternating flux in said core whereby the effective inductance of said resonant circuit varies with the amplitude of said resultant current and synchronism between the oscillations generated and the control alternating current is maintained by virtue of the fact that at a particular phase relation between said oscillations and said current the said resultant current causes said effective inductance to tune said resonant circuit to exact synchronism with said control current, which departure in either direction from this particular phase relation causes said effective inductance to change in such direction as to oppose such departure from this particular phase relation.

GERARD HEPP.